US012671552B2

(12) United States Patent (10) Patent No.: US 12,671,552 B2
Ma et al. (45) Date of Patent: Jun. 30, 2026

(54) METHOD PERFORMED BY USER EQUIPMENT, AND USER EQUIPMENT

(71) Applicant: SHARP KABUSHIKI KAISHA, Sakai City (JP)

(72) Inventors: Xiaojun Ma, Shanghai (CN); Chao Luo, Shanghai (CN); Renmao Liu, Shanghai (CN)

(73) Assignee: SHARP KABUSHIKI KAISHA, Sakai City (JP)

( * ) Notice: Subject to any disclaimer, the term of this patent is extended or adjusted under 35 U.S.C. 154(b) by 314 days.

(21) Appl. No.: 18/571,659

(22) PCT Filed: Jun. 17, 2022

(86) PCT No.: PCT/CN2022/099465
§ 371 (c)(1),
(2) Date: Dec. 18, 2023

(87) PCT Pub. No.: WO2022/267993
PCT Pub. Date: Dec. 29, 2022

(65) Prior Publication Data
US 2024/0283607 A1 Aug. 22, 2024

(30) Foreign Application Priority Data
Jun. 21, 2021 (CN) .......................... 202110688811.5

(51) Int. Cl.
H04L 5/00 (2006.01)
(52) U.S. Cl.
CPC .................................. H04L 5/0051 (2013.01)

(58) Field of Classification Search
CPC ... H04L 5/0048; H04L 5/0051; H04L 5/0057; H04L 5/0094; Y02D 30/70
See application file for complete search history.

(56) References Cited

U.S. PATENT DOCUMENTS

2021/0321462 A1* 10/2021 Takahashi ......... H04W 74/0891
2022/0256458 A1* 8/2022 Noh .......................... H04B 7/06
2024/0204953 A1* 6/2024 Go ........................ H04B 17/328

OTHER PUBLICATIONS

Moderator (Samsung), "6th Round Discussion on TRS/CSI-RS occasion(s) for idle/inactive UEs", R1-210xxxx, 3GPP TSG RAN WG1 #106-e, e-Meeting, Aug. 16-27, 2021.
3GPP TS 38.214 V16.5.0 (Mar. 2021) 3rd Generation Partnership Project; Technical Specification Group Radio Access Network; NR; Physical layer procedures for data (Release 16).

* cited by examiner

*Primary Examiner* — Donald L Mills
(74) *Attorney, Agent, or Firm* — ScienBiziP, P.C.

(57) ABSTRACT
Provided in the present invention is a method performed by user equipment (UE), including: receiving first indication information and second indication information, the first indication information representing a synchronization signal block (SSB) sequence number of an SSB actually transmitted in a network, and the second indication information representing a sequence and indication bits related to a plurality of channel state information reference signal (CSI-RS) configuration groups; and determining, according to the first indication information and the second indication information, the correspondence between a CSI-RS signal corresponding to each one of the plurality of CSI-RS configuration groups and the SSB sequence number of the SSB actually transmitted in the network.

2 Claims, 3 Drawing Sheets

Receive a bit indication ⟍⟋ 401

Determine, according to the received bit indication, a CSI-RS signal resource in one or two consecutive slots ⟍⟋ 403

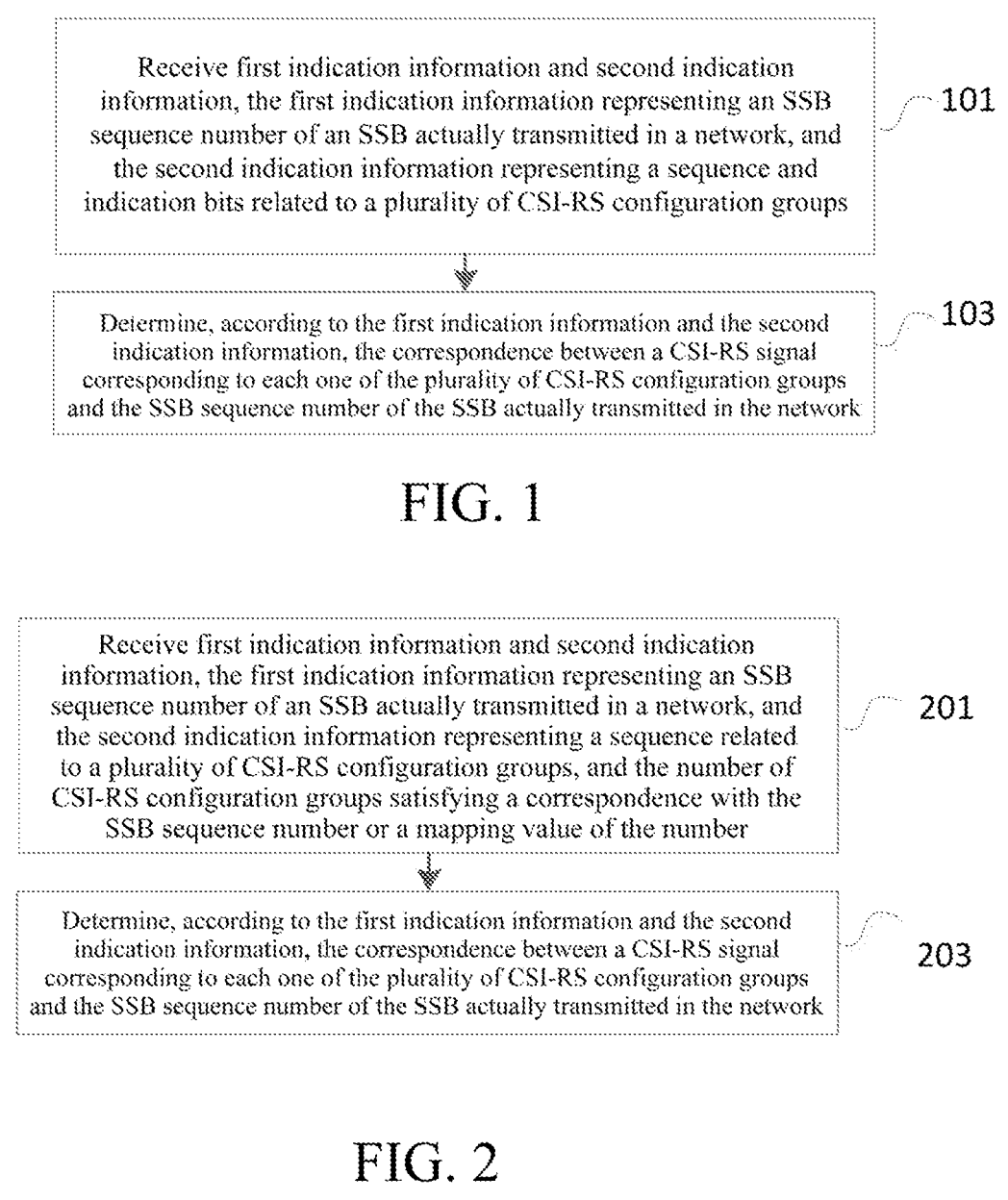

Receive first indication information and second indication information, the first indication information representing an SSB sequence number of an SSB actually transmitted in a network, and the second indication information representing a sequence and indication bits related to a plurality of CSI-RS configuration groups ⟋ 101

Determine, according to the first indication information and the second indication information, the correspondence between a CSI-RS signal corresponding to each one of the plurality of CSI-RS configuration groups and the SSB sequence number of the SSB actually transmitted in the network ⟋ 103

FIG. 1

Receive first indication information and second indication information, the first indication information representing an SSB sequence number of an SSB actually transmitted in a network, and the second indication information representing a sequence related to a plurality of CSI-RS configuration groups, and the number of CSI-RS configuration groups satisfying a correspondence with the SSB sequence number or a mapping value of the number ⟋ 201

Determine, according to the first indication information and the second indication information, the correspondence between a CSI-RS signal corresponding to each one of the plurality of CSI-RS configuration groups and the SSB sequence number of the SSB actually transmitted in the network ⟋ 203

FIG. 2

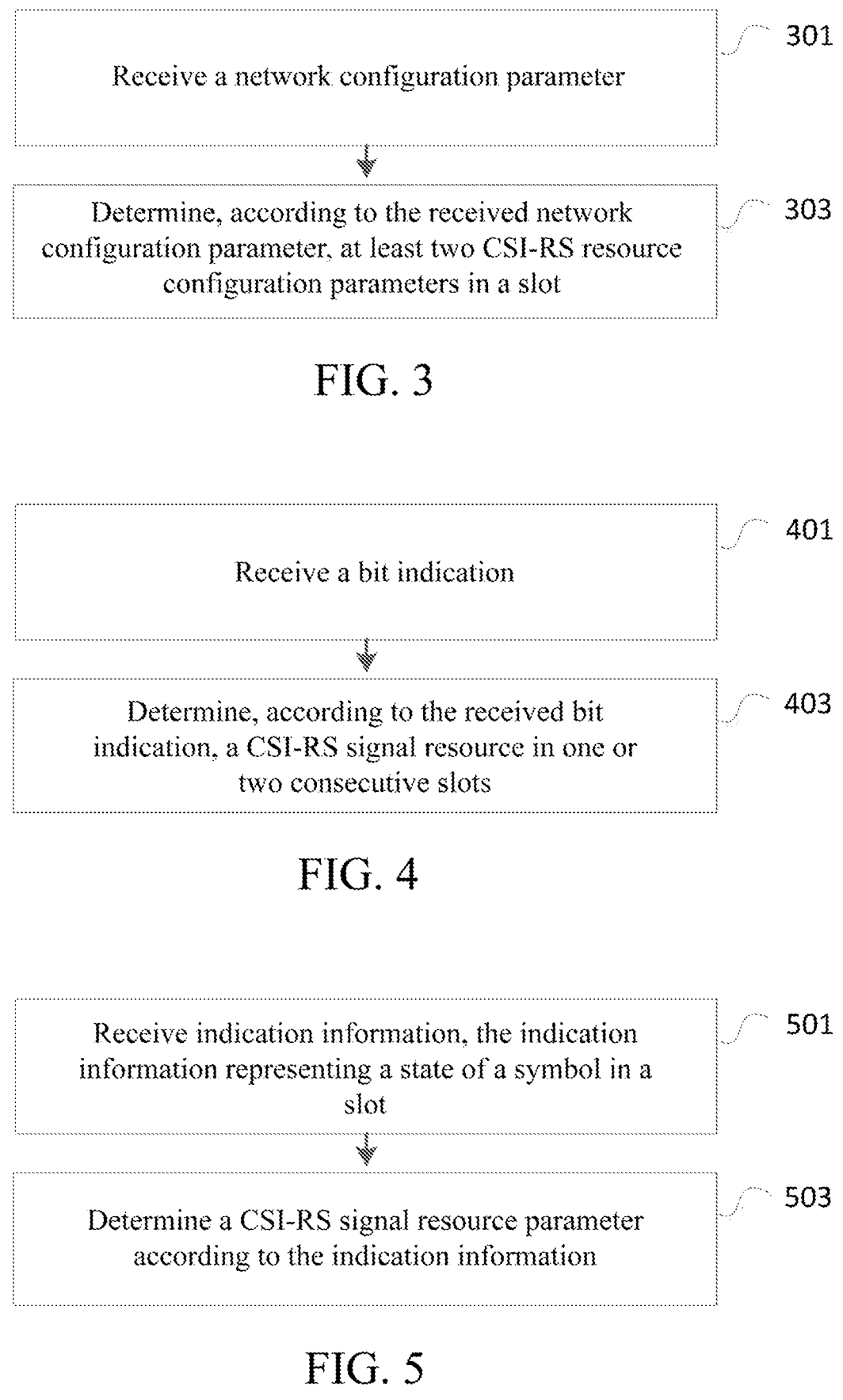

Receive a network configuration parameter    ⌐ 301

↓

Determine, according to the received network configuration parameter, at least two CSI-RS resource configuration parameters in a slot    ⌐ 303

FIG. 3

Receive a bit indication    ⌐ 401

↓

Determine, according to the received bit indication, a CSI-RS signal resource in one or two consecutive slots    ⌐ 403

FIG. 4

Receive indication information, the indication information representing a state of a symbol in a slot    ⌐ 501

↓

Determine a CSI-RS signal resource parameter according to the indication information    ⌐ 503

METHOD PERFORMED BY USER EQUIPMENT, AND USER EQUIPMENT

TECHNICAL FIELD

The present invention relates to the technical field of wireless communications, and in particular to a method performed by user equipment, and corresponding user equipment.

BACKGROUND

User experience is one of the key factors of the success of 5G/NR, and is not merely a user-experienced data rate and delay, and reduction in terminal power consumption is also an important aspect. The enhanced technical solution of reduction in terminal power consumption is one of the elements of the success of 5G/NR. Although some existing techniques have been used for the reduction in terminal power consumption, an additional enhanced evolved technology is still one of key technologies in future development. For example, the power consumption reduction technology may be applied to a terminal in an RRC_idle state or an RRC_inactive state, thereby facilitating further reduction in power consumption of a terminal device in a corresponding state while ensuring a communication capability, or improving a signal receiving capability, and achieving some other benefits.

SUMMARY

In order to solve at least some of the above problems, provided in the present invention are a method performed by user equipment and user equipment. Reference signal reception can enable a terminal to be capable of further acquiring an accurate measurement or parameter estimate, more sleep time, a better signal receiving capability, or the like, so that the terminal achieves benefits such as reduction in power consumption and improvement in the receiving capability, thereby improving a network service capability and expanding network compatibility, such that costs of communication network deployment are greatly reduced.

According to the present invention, provided is a method performed by user equipment (UE), comprising: receiving first indication information and second indication information, the first indication information representing an SSB sequence number of a synchronization signal block (SSB) actually transmitted in a network, and the second indication information representing a sequence and indication bits related to a plurality of channel state information reference signal (CSI-RS) configuration groups; and determining, according to the first indication information and the second indication information, the correspondence between a CSI-RS signal corresponding to each one of the plurality of CSI-RS configuration groups and the SSB sequence number of the SSB actually transmitted in the network.

Preferably, each bit of the indication bits represents: whether the CSI-RS configuration group corresponding to the bit uses a different SSB sequence number than a preceding CSI-RS configuration group.

In addition, according to the present invention, provided is a method performed by user equipment (UE), comprising: receiving first indication information and second indication information, the first indication information representing an SSB sequence number of a synchronization signal block (SSB) actually transmitted in a network, and the second indication information representing a sequence related to a plurality of channel state information reference signal (CSI-RS) configuration groups, and the number of CSI-RS configuration groups satisfying a correspondence with the SSB sequence number or a mapping value of the number; and determining, according to the first indication information and the second indication information, the correspondence between a CSI-RS signal corresponding to each one of the plurality of CSI-RS configuration groups and the SSB sequence number of the SSB actually transmitted in the network.

In addition, according to the present invention, provided is a method performed by user equipment (UE), comprising: receiving a network configuration parameter; and determining, according to the received network configuration parameter, at least two channel state information reference signal (CSI-RS) resource configuration parameters in a slot.

In addition, according to the present invention, provided is a method performed by user equipment (UE), comprising: receiving a bit indication; and determining, according to the received bit indication, a channel state information reference signal (CSI-RS) signal resource in one or two consecutive slots.

Preferably, CSI-RS resource configuration parameters of the two consecutive slots are the same, and the resource configuration parameter comprises any one of a period, a first symbol location, a frequency domain starting position and bandwidth, a power deviation, and a subcarrier starting position.

Preferably, CSI-RS resource configuration parameters of the two consecutive slots are different, and the resource configuration parameter comprises a scrambling code sequence number.

In addition, according to the present invention, provided is a method performed by user equipment (UE), comprising: receiving an indication of whether a scrambling parameter is present; and determining, according to the received indication, a channel state information reference signal (CSI-RS) signal resource in one or two consecutive slots.

In addition, according to the present invention, provided is a method performed by user equipment (UE), comprising: receiving indication information, the indication information representing a state of a symbol in a slot; and determining, according to the indication information, a channel state information reference signal (CSI-RS) signal resource parameter.

In addition, according to the present invention, provided is user equipment, comprising: a processor; and a memory, having instructions stored therein, wherein when run by the processor, the instructions perform the aforementioned method.

According to the present invention, reference signal reception can enable a terminal to be capable of further acquiring an accurate measurement or parameter estimate, more sleep time, a better signal receiving capability, or the like, so that the terminal achieves benefits such as reduction in power consumption and improvement in the receiving capability, thereby improving a network service capability and expanding network compatibility, such that costs of communication network deployment are greatly reduced.

BRIEF DESCRIPTION OF THE DRAWINGS

The above and other features of the present invention will be more apparent from the following detailed description in combination with the accompanying drawings, in which:

FIG. 1 is a flowchart showing a method performed by user equipment according to an embodiment of the present invention.

FIG. 2 is a flowchart showing a method performed by user equipment according to an embodiment of the present invention.

FIG. 3 is a flowchart showing a method performed by user equipment according to an embodiment of the present invention.

FIG. 4 is a flowchart showing a method performed by user equipment according to an embodiment of the present invention.

FIG. 5 is a flowchart showing a method performed by user equipment according to an embodiment of the present invention.

DETAILED DESCRIPTION

Figure 6:
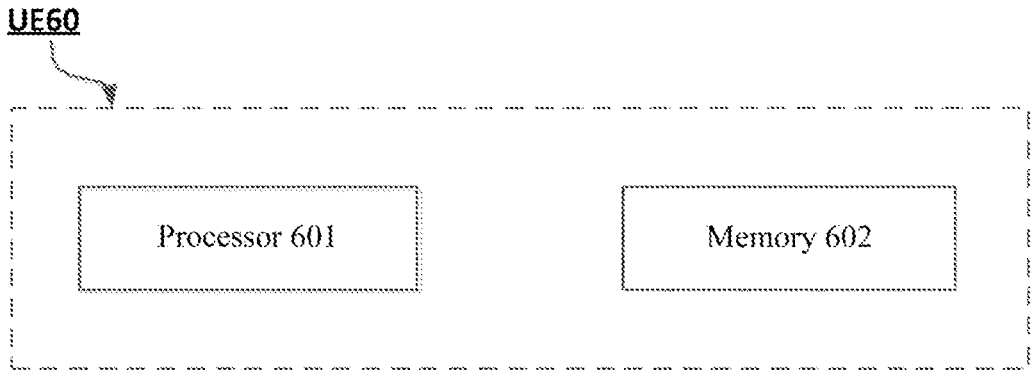
FIG. 6 is a block diagram schematically showing user equipment according to the present invention.

The following describes the present invention in detail with reference to the accompanying drawings and specific embodiments. It should be noted that the present invention should not be limited to the specific embodiments described below. These embodiments are merely provided as examples to convey the scope of the subject matter to those skilled in the art. In addition, detailed descriptions of well-known technologies not directly related to the present invention are omitted for the sake of brevity, in order to avoid obscuring the understanding of the present invention.

Typically, all terms used herein will be interpreted according to the ordinary meaning thereof in the related technical field unless different meanings are clearly presented and/or implied in the context where the terms are used. Unless specified otherwise clearly, all references to a/one/the element, apparatus, assembly, component, step, etc., should be publicly interpreted as referring to at least one instance of the element, apparatus, assembly, component, step, etc. The steps of any method disclosed herein do not need to be performed in the exact order disclosed unless one step has to be explicitly described as being after or before another step and/or one step has to be after or before another step as implied. In appropriate cases, any feature of any embodiment disclosed herein is applicable to any other embodiment. Likewise, any advantage of any embodiment is applicable to any other embodiment, and vice versa.

In the following description, a 5G/NR mobile communication system and later evolved versions thereof are used as exemplary application environments to describe a plurality of embodiments according to the present invention in detail. However, it is to be noted that the present invention is not limited to the following embodiments, but is applicable to many other wireless communication systems, such as a communication system after 5G, a 4G mobile communication system before 5G, and an 802.11 wireless network.

Some terms involved in the present invention are described below. Unless otherwise specified, the terms used in the present invention use the definitions herein. The terms given in the present invention may vary in LTE, LTE-Advanced, LTE-Advanced Pro, NR, and subsequent or other communication systems, but unified terms are used in the present invention. When applied to a specific system, the terms may be replaced with terms used in the corresponding system.

3GPP: 3rd Generation Partnership Project
LTE: Long Term Evolution
NR: New Radio

UE: User Equipment
gNB: NR base station
RedCap Device: Reduced Capability Device
FR1: Frequency range 1 as defined in TS 38.104
FR2: Frequency range 2 as defined in TS 38.104
BWP: Bandwidth Part
SFN: System Frame Number
OFDM: Orthogonal Frequency Division Multiplexing
CP: Cyclic Prefix
TA: Timing Advance
SCS: Sub-Carrier Spacing
RB: Resource Block
RE: Resource Element
CRB: Common Resource Block
PRB: Physical Resource Block
VRB: Virtual Resource Block
REG: Resource Element Group
EPRE: Energy Per Resource Element
TDD: Time Division Duplexing
FDD: Frequency Division Duplexing
CSI: Channel State Information
DCI: Downlink Control Information
MCS: Modulation and Coding Scheme
SRS: Sounding Reference Signal
DMRS: Demodulation Reference Signal
CSI-RS: Channel State Information Reference signal
TRS: Tracking Reference Signal
CRC: Cyclic Redundancy Check
SFI: Slot Format Indication
QCL: Quasi Co-Location
HARQ: Hybrid Automatic Repeat Request
SIB: System Information Block
SIB1: System Information Block Type 1
PSS: Primary Synchronization Signal
SSS: Secondary Synchronization Signal
MIB: Master Information Block
SSB: Synchronization Signal Block
CORESET: Control Resource Set
RACH: random-access channel
PBCH: Physical Broadcast Channel
PUCCH: Physical Uplink Control Channel
PUSCH: Physical Uplink Shared Channel
PRACH: Physical random-access channel
PDSCH: Physical downlink shared channel
PDCCH: Physical downlink control channel
UL-SCH: Uplink Shared Channel
DL-SCH: Downlink Shared Channel
NZP-CSI-RS: Non-Zero-Power CSI-RS
C-RNTI: Cell Radio Network Temporary Identifier
P-RNTI: Paging RNTI
RA-RNTI: Random Access RNTI
CS-RNTI: Configured Scheduling RNTI
SI-RNTI: System Information RNTI
TC-RNTI: Temporary C-RNTI The following is a description of technologies associated with the solution of the present invention. Unless otherwise specified, the same terms in the specific embodiments have the same meanings as in the associated technologies.

It is worth pointing out that the user, the user equipment, and the terminal device in the specification of the present invention have the same meaning, and the UE herein may also represent a terminal, which will not be specifically differentiated or defined hereinafter. Similarly, network devices are devices communicating with a terminal, and include, but are not limited to, a base station device, a gNB, an eNB, a wireless AP, etc., and will not be specifically differentiated or defined hereinafter. Herein, description may also be provided by using a base station as a form of a network device that is implemented, and in a specific implementation, other network device forms may be easily used for replacement.

A unit of time-frequency resources in NR is a slot. According to different network settings, one slot may include 14 (in a normal CP scenario) or 12 (in an extended CP scenario) OFDM symbols. A plurality of slots may form a subframe and a radio frame. One radio frame uses a length of 10 milliseconds, and may consist of several slots according to different subcarrier spacing parameters. For example, when the subcarrier spacing is 15 kHz, one radio frame consists of 10 slots. The terminal may determine the slot location according to parameters such as a frame number SFN of the radio frame and the sequence number of the slot in the radio frame. The terminal may also determine a symbol location of signal transmission in the time domain according to the sequence number of a symbol in the slot. The radio frame may also be divided, according to the time, into two equal half-frames, i.e., a former half-frame and a latter half-frame.

Resources in NR may be further divided into resource blocks and resource elements. The resource block (RB) may be defined in the frequency domain as $$N_{sc}^{RB} = 12$$

consecutive subcarriers. For example, for a 15 kHz subcarrier spacing (SCS), the RB is 180 kHz in the frequency domain. For a 15 kHz$\times 2^\mu$ subcarrier spacing, the resource element (RE) represents one subcarrier in the frequency domain and one OFDM symbol in the time domain. The value of $\mu$ may be an integer value within the range 0-4 in different configurations. The signal within the bandwidth may be numbered according to the SCS used. For example, PRBs within a bandwidth range in the frequency domain may be numbered 0, 1, 2, . . . , N_BWP_$\mu$ so as to determine the location of the corresponding resource in the bandwidth.

According to different cases such as whether a connection to a wireless network is established and whether a wireless connection is suspended, terminals in the network may be divided into different states, such as an RRC_connected state, an RRC_idle state, an RRC_inactive state, and the like. A wireless connection is established between a user in the RRC_connected state and the network, and is used to perform data transmission or relevant service processing. A terminal in the RRC_idle state or the RRC_inactive state also maintains a certain connection to the network. For example, the terminal needs to monitor, according to a relevant configuration or parameter, a broadcast message and a paging message transmitted by the network, or perform relevant measurement, or the like. The processing of the user in the RRC_idle state is similar to the processing of the user in the RRC_inactive state in many aspects of the present invention. In order to avoid redundancy, if not indicated otherwise, in the present invention, the relevant actions related to the terminal in the RRC_idle state or the network may also be applied to the terminal in the RRC_inactive state. Other user states similar to the RRC_idle state may also be processed by analogy, and details will not be described herein.

If the terminal in the idle or RRC_inactive state does need to receive, transmit, or measure any signal, or the like, the terminal may be in a sleep state to reduce power consumption. According to different channel conditions, services required to be processed, or the like, the terminal may be in different sleep modes. For example, a light sleep mode is for transient dormancy in which a new signal needs to be processed within a short time. As another example, a deep sleep mode is used when the terminal does not need to process a new signal within a long time, and may reduce more power consumption of the terminal than the light sleep mode. Generally, in the case that no service function is affected, causing the terminal to be in the dormant mode can effectively reduce power consumption of the terminal, thereby improving the user experience.

Upon or before the terminal receives a data signal, some preprocessing is often required. For example, the terminal may adjust an automatic gain control (AGC) parameter, so that processed data is within a suitable dynamic range thereof, so as to achieve a good reception effect. Alternatively, the terminal needs to perform time-frequency tracking, and estimate a time deviation or frequency deviation parameter or the like of a signal according to a reference signal, and perform corresponding correction on the signal or data to be processed, so as to achieve good reception performance. The terminal may also perform some other processing to optimize data processing, improve user experience, and so on, and details will not be described herein again. The terminal may perform preprocessing by using a reference signal transmitted by the network. For example, the terminal may perform relevant actions such as time-frequency synchronization according to one or more synchronization signals.

The network may configure and transmit a reference signal to the terminal. The reference signal is used for channel measurement, channel parameter estimation, mobility assessment, spatial parameter estimation, and the like of the terminal, thereby implementing functions such as radio resource management and reception of auxiliary data and signals. For example, the terminal may receive a synchronization reference signal transmitted by the network, perform an AGC adjustment, an estimation of a time-frequency parameter, or the like. Alternatively, the terminal may receive a CSI-RS signal transmitted by the network so as to perform channel measurement, beam management, or the like.

The network configures and transmits a CSI-RS reference signal, and the CSI-RS reference signal is used for the terminal to perform functions such as channel measurement and beam management. A CSI-RS signal parameter may be configured to the UE in the form of a CSI-RS resource, and one terminal may be configured with one or more CSI-RS resources. One or more CSI-RSs may also form one CSI-RS resource set, and one terminal may be configured with one or more resource sets. One CSI-RS signal is defined in each CSI-RS resource, and may include a plurality of configuration parameters, for example, one or a plurality of a time domain period and offset configuration, a frequency domain location and bandwidth configuration, a power configuration, a code division parameter configuration, a QCL configuration, a frequency domain density parameter, a subcarrier location . . . etc. The terminal may determine and receive a CSI-RS signal according to a configured parameter, and the CSI-RS signal is used for functions such as measurement or signal reception. For example, a CSI-RS signal is received in a plurality of time-frequency locations according to a configured period and offset.

According to some configuration parameters, the CSI-RS may be divided into a plurality of types. For example, an NZP-CSI-RS is a non-zero-power CSI-RS. That is, transmission power of the CSI-RS is not zero. According to the configuration period, the CSI-RS may also be divided into periodic, semi-permanent, and aperiodic signal types. For a periodic CSI-RS, after the configuration takes effect, the associated CSI-RS resource repeatedly occurs on the time-frequency resources according to a certain period. Semi-permanent and aperiodic CSI-RS resources need to be activated by means of a manner indicated by a MAC-CE or DCI. The terminal may implement different functions according to resources of different CSI-RSs and related report indications, etc. A CSI-RS signal for time-frequency tracking may also be referred to as a TRS. In the present invention, CSI-RS is uniformly used as the name for CSI-RSs of different types or parameters applicable to the present invention or other signals capable of implementing similar functions.

The network transmits an SSB signal according to a certain period. An SSB may include a plurality of reference signals, such as an SSS, a PSS, and the like. The network may use a spatial filter or a beam to perform signal transmission and reception. The beam used in the network may be an analog beam or a digital beam or a combination thereof. The network transmits an SSB by using a corresponding beam. For example, the network transmits the SSBs by using eight beams, so that the SSBs in the transmission period may be numbered SSB0 to SSB7 respectively representing the SSBs transmitted by using the different beams. The terminal may select, according to different locations, the optimal beam to perform signal reception or transmission, so as to achieve good communication. The network may also use different beams and terminals to perform signal transceiving, so as to achieve a good communication effect.

A QCL parameter is used in the network to indicate a spatial relationship between different signals. That is, two signals satisfying a QCL relationship have a certain spatial channel association. For example, the network configures two signals to satisfy a certain QCL type relationship. The terminal may use the same certain parameter when the terminal processes the two signals, or a parameter obtained by means of one signal may be applied to reception or transmission of the other signal. For example, the QCL type is QCL-typeA, and parameters such as a Doppler shift, a Doppler spread, an average latency, and a delay extension obtained by means of one signal may be applied to the other signal. That is, the foregoing parameters are shared. As another example, the QCL type is QCL-typeC, and parameters such as a Doppler shift and a delay extension parameter of one signal may be obtained by means of one signal. As another example, the QCL type is QCL-typeD, and beam parameter information of one signal may be obtained by means of one signal. There are several other QCL types, and a user may perform identification according to relevant parameters during application. A user may also perform application of a relevant parameter between more signals mutually satisfying the QCL relationship, and the specific types will not be described one by one.

The CSI-RS signal transmitted by the network may be transmitted by using a beam, and the network may configure a reference signal of the CSI-RS to be a signal satisfying the QCL relationship therewith. For example, the network may configure an SSB i to be a reference signal, which satisfies a certain QCL relationship, of a CSI-RS signal. The terminal may consider that the SSB i has some of the same channel parameters as the CSI-RS, such as a spatial signal parameter, a Doppler shift parameter, and the like. If another signal on the terminal side and the SSB i satisfy the QCL, the terminal may also acquire a relevant parameter by means of reception or measurement of the CSI-RS, and apply the relevant parameter to signal reception.

The CSI-RS signal is transmitted on a configured and indicated time-frequency resource of the network. For example, the network may configure a period and an offset of the CSI-RS, and the terminal may determine a slot location of CSI-RS transmission according to the configuration parameter. For example, the configuration parameter period is x, and the slot offset number in the period is y. The terminal may determine, according to a radio frame number SFN, that a starting position of the CSI-RS period is a radio frame satisfying SFN mod x=0. For example, the first slot of a certain radio frame satisfying a period condition is k. Then, it is determined, according to the starting position, that a slot n=k+y in the period is a slot satisfying the offset parameter. The network may also configure the period and the offset of the CSI-RS by other means, such as by configuring a period of a time unit and a method of a slot offset. The network may configure the period of the CSI-RS to be one of {10, 20, 40, 80} milliseconds. The terminal may determine a slot unit length according to a subcarrier parameter of a BWP in which the CSI-RS is located, and may determine the total number of slots in the period. Then, the slot location of the CSI-RS is determined according to the offset of the CSI-RS with respect to the period. The terminal may determine a CSI-RS in slots of several determined periods of the resource according to a period parameter of the CSI-RS.

The network may also configure a symbol location of the CSI-RS, and the terminal may determine, according to the symbol location, a time domain location of specific transmission of the CSI-RS in a determined slot. The network may configure the starting position and the bandwidth of the CSI-RS, and the CSI-RS is transmitted on a PRB determined according to the configuration. The network may configure frequency domain density and a frequency domain allocation parameter of the CSI-RS, and the terminal may determine, according to the configuration, which REs in an RB are occupied by the CSI-RS for transmission. According to different configuration parameters, the CSI-RS may use some of the REs in the RB in the frequency domain. For example, the frequency domain density parameter used by the CSI-RS is 3, so that three REs of 12 REs determined on one symbol and one RB are used for CSI-RS signal transmission, and the remaining REs are not used for CSI-RS signal transmission. The sequence number of the RE used by the CSI-RS signal on the RB may be determined by a configuration parameter. For example, a four-bit bitmap is used to determine which REs of each four REs are used for CSI-RS signal transmission. The sequence number may also be used for indication. For example, 0 indicates starting from a first RE, 1 indicates starting from a second RE, and so on. The network may also configure several other parameters, and the terminal may determine the characteristics of the CSI-RS signal according to the relevant configuration, and use same for relevant reception, measurement, or the like. The network may use the CSI-RS resource to represent the parameter used by the CSI-RS signal, and the terminal may determine CSI-RS signal generation, a time-frequency location, and the like according to the CSI-RS resource parameter.

The terminal in the RRC_idle state or the RRC_inactive state needs to periodically receive broadcast or paging information of the network, or perform relevant measurement. For example, before receiving the paging information, the terminal may receive, according to factors such as the capability thereof and a channel condition, a reference signal transmitted by the network, perform AGC and processing such as time-frequency tracking, and receive a corresponding data signal, so as to achieve a good effect. Due to various internal or external factors, the number of times or duration the terminal needs to wake up from the dormant mode are different when the terminal performs the foregoing preprocessing. For example, when the channel condition is poor, the relevant reference signal reception quality is poor, or when the processing capability of the terminal is limited, the terminal needs to be woken up a plurality of times to receive a plurality of reference signals, so as to achieve a good reception effect. As another example, the configured reference signal is far from the signal to be received, and the terminal may also need to receive the reference signal a plurality of times or maintain a long active time so as to achieve a good reception effect.

The user equipment in the RRC_idle state or the RRC_inactive state may utilize an SSB to implement relevant AGC or time-frequency parameter estimation. The period and the time-frequency location of the SSB are typically fixed, and may not be capable of meeting the requirements of different users to receive signals and reduce power consumption. Therefore, the network may provide an additional reference signal for reception performed by the terminal, so that the terminal can acquire the required parameter or information faster, thereby reducing the time or number of times of wake-up, and achieving a better power saving effect. The network may configure a CSI-RS signal to be used as a reference signal of an idle or inactive user. For example, the network configures several non-zero-power CSI-RS signals in SIB broadcast information, which are used as reference signals of an idle or inactive user. To reduce power consumption of the network, the network may use the CSI-RS signal transmitted to a user in the RRC_connected state to share with a user in the RRC_idle state for use. The network may configure one or more CSI-RS resources to the user in the RRC_idle state, and some or all of the resources may also be signals given to the user in the RRC_connected state to use. If the user in the RRC_connected state no longer uses the foregoing resources, the network may partially or completely turn off the foregoing CSI-RS signals according to different situations, so as to reduce power consumption on the network side.

The network may transmit a CSI-RS related configuration message to the terminal by means of a signaling message. For example, the terminal in the network is notified of a configuration parameter by means of a system information block (SIB). The network may transmit a CSI-RS configuration message periodically or according to a request from the terminal. The terminal may acquire the message according to appropriate signaling and procedures, thereby acquiring the relevant configuration parameter of the CSI-RS. The configuration parameter may also be transmitted to the terminal by means of an RRC message. For example, a network device carries a relevant parameter in an RRC release message. The terminal may receive a relevant message upon release of a radio link, thereby acquiring a CSI-RS configuration for subsequent processing of the RRC_idle state or the RRC_inactive state.

The network needs to use certain signaling overhead to transmit the CSI-RS configuration parameter, and in order to cause the size of the transmitted signaling to be appropriate, the configuration means of the relevant parameter needs to be considered. For example, the network may use an appropriate means to represent each CSI-RS resource configuration parameter, and the terminal may acquire sufficient CSI-RS configuration information according to a small amount of data, thereby achieving optimal system efficiency.

The network may also consider the relationship between different CSI-RSs, so that sufficient information can be transmitted by using a limited message. The terminal may acquire a plurality of CSI-RS signal configurations according to one or a set of configuration parameters, thereby improving system efficiency.

The terminal may determine one or more CSI-RS resources according to the configuration of the network. Whether a CSI-RS signal is actually transmitted on the foregoing resources may be controlled by the network. For example, when the network transmits a CSI-RS signal, CSI-RS transmission configuration adjustment, or starting or stopping of signal transmission, or the like may be performed according to the adjustment of the user in the RRC_connected state, or network power consumption reduction, or other reasons, or the like. In this case, the user in the RRC_idle state needs to be notified to perform parameter adjustment or configuration, so that the user in the RRC_idle state can receive the signal correctly.

The network may indicate the state of the configured CSI-RS resource by transmitting indication information. For example, the network may indicate the available or unavailable state of the CSI-RS resource by means of physical layer or higher layer signaling. For example, the state of the associated CSI-RS resource is indicated one time by means of physical layer signaling, and the state of the CSI-RS resource in a plurality of time-frequency locations may also be indicated by means of physical layer signaling. The terminal determines, according to indication information and other parameters that may be required, whether a relevant CSI-RS resource can be used for relevant processing, that is, determines whether a configured CSI-RS resource is valid or available in a certain time-frequency location. The terminal determines that the CSI-RS signal is transmitted on the available CSI-RS resource.

FIG. 1 is a flowchart showing a method performed by user equipment according to an embodiment of the present invention.

As shown in FIG. 1, in step 101, first indication information and second indication information are received, the first indication information representing an SSB sequence number of an SSB actually transmitted in a network, and the second indication information representing a sequence and indication bits related to a plurality of channel state information reference signal (CSI-RS) configuration groups.

Then, in step 103, the correspondence between a CSI-RS signal corresponding to each one of the plurality of CSI-RS configuration groups and the SSB sequence number of the SSB actually transmitted in the network is determined according to the first indication information and the second indication information.

The network may configure a CSI-RS resource parameter by means of an SIB system information block message, and the CSI-RS resource parameter is used to configure a user in an idle or RRC_inactive state to receive a CSI-RS signal. For example, the network transmits several CSI-RS signal configuration parameters by means of a system broadcast message. Each group of configuration parameters may be referred to as a configuration group. The terminal may acquire at least one CSI-RS resource parameter according to each configuration group parameter. For example, at least one of parameters such as a time-frequency location, a bandwidth, density, and a reference signal used to receive a CSI-RS signal can be determined.

The network may indicate an SSB transmission parameter by means of an SIB or RRC message. For example, the network indicates, by means of an ssb-PositionsInBurst information element in SIB1, the sequence number of the actually-transmitted SSB. ssb-PositionsInBurst may further include a plurality of parameters, and for example, the network indicates a transmission situation of all SSBs in each SSB in each SSB group by means of an inOneGroup parameter therein. When the maximum number of SSBs in each half-frame is four, four bits are used to indicate the transmission situation of the SSBs. When the maximum number of SSBs in each half-frame is eight, eight bits are used to indicate the transmission situation of the SSBs. The sequence number of the SSB corresponding to the leftmost bit of the inOneGroup parameter is 0. When the maximum number of SSBs in the half-frame is 64, each eight SSBs may be grouped into one group, and eight bits are used to represent the transmission situation of the SSBs in each group. The leftmost bit corresponds to the first SSB sequence number in each group. That is, the corresponding SSB sequence numbers are 0, 8, 16, and so on, and the other bits correspond to the SSB sequence numbers in the same manner. The bit is set to 0 to represent that the SSB corresponding to the relevant sequence number is not actually transmitted. The bit is set to 1 to represent that the SSB corresponding to the relevant sequence number is transmitted. When the maximum number of SSBs in the half-frame is greater than eight, for example, 64, the network further transmits, by means of an 8-bit groupPresence parameter, whether each antenna group is present. The leftmost bit is related to SSB sequence numbers 0-7, and the second bit is related to SSB sequence numbers 8-15, etc. Setting a bit to 0 is used to represent that the SSBs of the group are not present, or that none of the SSBs of the group is transmitted. The bit is set to 1 to represent that the group of SSBs are or are not transmitted according to the indication in inOneGroup. In this way, the network may indicate sequence numbers of all actually-transmitted SSBs in a half-frame in various scenarios. The network may also indicate, by other means, the SSB sequence number that is actually transmitted in the system. For example, when the maximum number of SSBs in the half-frame is 64, the transmission situation of all SSBs in the half-frame is represented by a 64-bit bitmap. The terminal may acquire, by means of the configuration of the network, the actually transmitted SSB in the half-frame. The terminal may acquire, according to a period parameter of the SSB, information of the SSB actually transmitted in the time domain.

When the network transmits one or more CSI-RS signals, a certain SSB signal may be used as a reference signal. For example, the foregoing CSI-RS signals use the same beam as the certain SSB, or have a QCL relationship with the SSB. The network may configure the parameter of the CSI-RS so that the terminal can acquire the correspondence between the CSI-RS and the SSB. The terminal may determine, according to the indication of the network, a configured correspondence between the CSI-RS signal and the SSB sequence number. The correspondence may be that the CSI-RS signal uses an SSB of a certain SSB sequence number as a reference signal, and the signals satisfy the QCL relationship therebetween.

In an optional embodiment, the terminal determines the correspondence between the CSI-RS signal and the SSB sequence number according to the sequence and indication bits of the CSI-RS configuration groups or a value in the system message.

Optionally, the terminal determines the correspondence between the CSI-RS signal and the SSB sequence number according to the sequence and indication bits of the CSI-RS configuration groups. The terminal determines that a sequential relationship is satisfied when the configuration groups use different SSB sequence numbers. For example, the bit 0 is used to represent that the CSI-RS signal determined by the CSI-RS configuration group uses a different SSB sequence number than the preceding configuration group, and the SSB sequence number is an SSB sequence number that is after the preceding SSB sequence number and satisfies the sequential relationship. The bit 1 is used to represent that the CSI-RS signal determined by the CSI-RS configuration group uses the same SSB sequence number as the preceding configuration group. For a first configuration group, that is, no preceding resource configuration is present, the first SSB sequence number indicated as actually transmitted is used as the SSB sequence number satisfying the correspondence.

In a specific example, it is assumed that according to the network configuration, a half-frame has a maximum of eight SSBs, and eight bits 11001111 are used to represent the actual transmission situation of the eight SSB sequence numbers. According to the preceding scheme, the terminal may determine that the SSB sequence numbers actually transmitted in the network are 0, 1, 4, 5, 6, and 7. It is assumed that the network is configured with 10 CSI-RS configuration groups, and 10 bits are used to indicate SSB sequence numbers corresponding to CSI-RS signals of these configuration groups. For example, the 10 bits are respectively 0010101010. The terminal may determine, one by one, the SSB sequence numbers corresponding to the CSI-RS signals of the configuration groups. Specifically, the CSI-RS indication bit of the first configuration group is 0, and the SSB sequence number corresponding thereto is the first actually-transmitted SSB0. The CSI-RS indication bit of the second configuration group is 0, and the SSB sequence number corresponding thereto is different from the preceding one, and is sequentially determined as the second actually-transmitted SSB1. The CSI-RS indication bit of the third configuration group is 1, and the SSB sequence number corresponding thereto is the same as the preceding one, and is SSB1. The CSI-RS indication bit of the fourth configuration group is 0, and the SSB sequence number corresponding thereto is different from the preceding one, and is the third actually-transmitted SSB sequence number, the SSB sequence number corresponding thereto being 4. In this way, the SSB sequence numbers corresponding to all CSI-RSs can be obtained in sequence.

In an optional embodiment, the terminal does not expect that the number of transmitted SSBs corresponding to the CSI-RS is greater than the number of actually-transmitted SSBs indicated by the network. If the SSB sequence number corresponding to the CSI-RS determined by the terminal is not the SSB sequence number actually transmitted by the network, or the terminal cannot determine, from the SSB sequence numbers actually transmitted by the network, the SSB sequence number corresponding to the CSI-RS, then the terminal does not use the foregoing CSI-RSs as reference signals.

In an optional embodiment, the terminal determines the correspondence between the CSI-RS signal and the SSB sequence number according to the sequence and indication bits of the CSI-RS configuration groups. The terminal determines that an incremental cyclical relationship is satisfied when the configuration groups use different SSB sequence numbers. When the number of SSB sequence numbers used by the configuration group determined by the terminal is greater than the number of actually-transmitted SSB sequence numbers, the terminal determines that the configuration group uses the first actually-transmitted SSB sequence number. The terminal causes the actually-transmitted SSB sequence numbers to cyclically correspond to the configuration group to determine the CSI-RS signal. For example, the bit 0 is used to represent that the CSI-RS signal determined by the CSI-RS configuration group uses a different SSB sequence number than the preceding configuration group does, and the SSB sequence number is an SSB sequence number after the preceding SSB sequence number. If no sequence number is available at this time, that is, the number of SSB sequence numbers is greater than the number of SSBs that are actually used, then the terminal uses the first SSB sequence number indicated as actually transmitted as the SSB sequence number satisfying the correspondence. The bit 1 represents that the CSI-RS signal determined by the CSI-RS configuration group uses the same SSB sequence number as the preceding configuration group. For the first configuration group, that is, no preceding resource configuration is present, the first SSB sequence number indicated as actually transmitted is used as the SSB sequence number satisfying the correspondence.

In a specific embodiment, it is assumed that according to the network configuration, a maximum of eight SSBs are present in a half-frame, and eight bits 11001111 are used to represent the actual transmission situation of the eight SSB sequence numbers. According to the preceding scheme, the SSB sequence numbers actually transmitted by the network are 0, 1, 4, 5, 6, and 7. The network uses 10 bits to indicate the correspondence between the CSI-RS and the SSB. For example, the 10 bits are respectively 0000000000. According to the indication bits, the first/second/third/fourth/fifth/ sixth CSI-RS configuration groups respectively correspond to the SSB sequence numbers 0, 1, 4, 5, 6, and 7. The terminal determines that the SSB sequence number used by the seventh configuration group is different from the preceding one. The terminal determines that the number of SSB sequence numbers used by the configuration group is greater than the number of SSBs that are actually used. The terminal determines, according to a cycling rule, that the CSI-RS and SSB0 have a correspondence therebetween. The SSB sequence number used by the eighth configuration group of the terminal is different from the preceding one. The terminal determines, according to an incremental cycling rule, that the CSI-RS and SSB1 have a correspondence therebetween, and so on. The terminal may determine the SSB sequence numbers corresponding to all CSI-RSs by means of a similar method.

In the foregoing embodiment, different indication means may be used. For example, setting the bit to 1 is used to indicate the SSB sequence number corresponding to the CSI-RS is different from the preceding configuration group, and setting the bit to 0 is used to represent that the SSB sequence number corresponding to the CSI-RS is the same as the preceding one, and so on. The relevant method for determining the SSB sequence number corresponding to the CSI-RS signal may be equally applicable, without affecting the spirit of the present invention.

In an optional embodiment, the network sets an indication bit for each CSI-RS configuration group, and the terminal determines the correspondence between the CSI-RS signal and the SSB sequence number according to a bit indicated in a CSI-RS configuration group parameter.

In an optional embodiment, the network sets a bit stream having a valid length being the number of CSI-RS configuration groups, and causes the bit stream to correspond to each CSI-RS configuration group according to the sequence of the CSI-RS configuration groups. The terminal may determine, according to an indication in the bit stream, an SSB sequence number corresponding to the CSI-RS indicated by the configuration group. Optionally, since the first CSI-RS always corresponds to the smallest SSB sequence number that is actually transmitted, the indication bit thereof may be omitted, and the terminal determines that the SSB corresponding to the CSI-RS is the smallest SSB sequence number that is actually transmitted. The terminal determines that the first bit of the bit stream indicates the SSB sequence number used by the second configuration group.

In an optional embodiment, the above embodiment may be applied to all or a part of configured CSI-RS configurations or configuration groups. For example, the network indicates that the part of the CSI-RS configuration groups indicated in the system message use the above method, and the terminal determines, according to the indication of the network, the corresponding SSB sequence numbers for the CSI-RS signals determined by the foregoing part of the CSI-RS configuration groups.

FIG. 2 is a flowchart showing a method performed by user equipment according to an embodiment of the present invention.

As shown in FIG. 2, in step 201, first indication information and second indication information are received, the first indication information representing an SSB sequence number of an SSB actually transmitted in a network, and the second indication information representing a sequence related to a plurality of CSI-RS configuration groups, and the number of CSI-RS configuration groups satisfying a correspondence with the SSB sequence number or a mapping value of the number.

Then, in step 203, the correspondence between a CSI-RS signal corresponding to each one of the plurality of CSI-RS configuration groups and the SSB sequence number of the SSB actually transmitted in the network is determined according to the first indication information and the second indication information.

In an optional embodiment, the terminal determines, according to the number of CSI-RS configuration groups satisfying a correspondence with each SSB sequence number, the SSB sequence number corresponding to the CSI-RS of each CSI-RS configuration group. For example, the terminal obtains, according to the configured number, the number N1 of CSI-RS configuration groups satisfying a correspondence with SSB0, and the terminal determines that the CSI-RSs determined by the first to N1-th CSI-RS configuration groups satisfy a correspondence with SSB0. The terminal, according to the configured number, obtains the number N2 of CSI-RS configuration groups satisfying a correspondence with SSB1, and the terminal determines that the CSI-RSs determined by the (N1+1)-th to (N1+N2)-th CSI-RS configuration groups satisfy a correspondence with SSB1. According to this method, the terminal may sequentially determine, one by one, the number of CSI-RS configuration groups satisfying a correspondence with each SSB sequence number, and the terminal may determine SSB sequence numbers corresponding to all CSI-RS configurations.

Optionally, the terminal determines, according to the value related to the SSB sequence number, the SSB sequence number corresponding to the CSI-RS. The network indicates the number of CSI-RSs related to the SSB, including the number of CSI-RSs related to the maximum number of SSBs in a half-frame determined according to a network configuration. The terminal determines, according to the indicated value, the SSB sequence number corresponding to the CSI-RS.

In a specific embodiment, for example, the network configures that a maximum of eight SSBs are used in a half-frame. The network configures 10 CSI-RS configuration groups. The network uses a value to indicate the number of CSI-RS configurations related to each SSB sequence number. For example, values [2, 2, 0, 0, 2, 2, 1, 1] are used to respectively indicate the numbers of CSI-RS configuration groups related to the eight SSBs. The terminal may determine, according to the sequence of the CSI-RS configuration groups, the SSB sequence number related to the CSI-RS. For example, SSB0 is in a correspondence with two CSI-RS configurations, and the terminal determines that the SSB sequence number 0 corresponds to the CSI-RS determined by the first and second CSI-RS configuration groups. The terminal may determine that the SSB sequence number 2 is not associated with any CSI-RS. Similarly, the terminal may determine that SSB 1 corresponds to the CSI-RS determined by the third and fourth CSI-RS configurations, and SSB4 corresponds to the CSI-RS determined by the fourth and fifth CSI-RS configuration groups. The SSB sequence numbers corresponding to all CSI-RSs may be determined by using a similar method.

In an optional embodiment, the terminal determines, according to an indication, the SSB sequence number corresponding to the CSI-RS for the value used by an actually transmitted SSB. When the network indicates the number of CSI-RSs related to the SSB, the SSB that is not actually transmitted is not included. The terminal determines, according to the indicated value, the SSB sequence number corresponding to the CSI-RS.

In a specific embodiment, for example, the network configures that a maximum of eight SSBs are present in a half-frame, and eight bits 11001111 are used to represent the actual transmission situation of the eight SSB sequence numbers. According to the preceding scheme, the SSB sequence numbers actually transmitted in the network are 0, 1, 4, 5, 6, and 7. The network configures 10 CSI-RS configurations. The network uses a value to indicate the number of CSI-RS configurations in a correspondence with each SSB. For example, a value sequence [2, 2, 2, 2, 1, 1] is used. The terminal may determine, according to the sequence of the CSI-RS configurations, the SSB sequence number related to each CSI-RS. For example, SSB0 is related to two CSI-RS configurations, and the terminal determines that the SSB sequence number corresponding to the CSI-RS determined by the first and second CSI-RS configurations is 0. Similarly, the terminal may determine that the SSB sequence number corresponding to the CSI-RS determined by the second and third CSI-RS configurations is 1, and that the CSI-RS determined by the fourth and fifth CSI-RS configurations corresponds to SSB 4. In turn, the SSB sequence numbers corresponding to all CSI-RSs may be determined.

In an optional embodiment, the value indicated by the network is a mapped number. For example, a method of n+1 is used. That is, the value 0 is used to represent that the indicated number is one, and the value 1 is used to represent that the indicated number is two, and so on. Alternatively, a method of 2n is used. That is, the value 0 is used to represent that the indicated number is zero. The value 1 is used to represent that the indicated number is two. The value 2 is used to represent that the indicated number is four, and so on. The relationship between the indicated value and the actual number can also be determined by using a look-up method. The network may define various mapping methods, and the terminal may determine, according to the mapping method, the number indicated by the network, without affecting the spirit of the present invention.

FIG. 3 is a flowchart showing a method performed by user equipment according to an embodiment of the present invention.

As shown in FIG. 3, in step 301, a network configuration parameter is received.

Then, in step 303, at least two CSI-RS resource configuration parameters in a slot are determined according to the received network configuration parameter.

A terminal may determine at least two CSI-RS resource configuration parameters according to a network configuration. The CSI-RS resource configuration parameters include a CSI-RS signal period, an offset slot number relative to the starting position of the period, a symbol location in a slot, a CSI-RS frequency domain bandwidth starting position and the number of bandwidths used in the frequency domain, a scrambling code sequence number related to a generated sequence, and the like. There may be a certain relationship between different CSI-RS resources configured by the network, such as using the same parameters, including the frequency domain bandwidth, the symbol location, and the like. The terminal may determine a configuration parameter of a plurality of CSI-RS resources according to a group of CSI-RS configurations, thereby reducing the load of network indication, and improving system efficiency.

In an optional embodiment, the terminal determines two CSI-RS resource parameters in one slot according to one configuration group parameter. The network configures a group of parameters. The terminal determines a first CSI-RS resource according to the configuration, and the terminal determines a second CSI-RS resource according to the first CSI-RS resource and an offset. The offset herein is a predefined or fixed number of symbols.

For example, the network configures a periodicity And-Offset parameter in a configuration group, and the terminal may determine, according to the parameter, the period of the CSI-RS resource and a slot location in the period. The network configures a firstOFDMSymbolInTimeDomain parameter, and the terminal may determine, according to the parameter, a symbol location used by a first CSI-RS signal in the slot location. The terminal determines different starting symbol parameters of the second CSI-RS resource and the first CSI-RS resource in the same slot. Optionally, the deviation between starting symbols of the two CSI-RS resources is a fixed number K of symbols. For example, the network configures the CSI-RS resource location to be S, and the terminal determines CSI-RS resources on a symbol S and a symbol S+K of the same slot. The terminal determines that the second CSI-RS resource and the first CSI-RS resource use the same parameter, including one or a plurality of a time domain period and an offset and a frequency domain bandwidth starting position and the number of bandwidths, a subcarrier starting position, a relative power offset, a scrambling code sequence number, or the like.

In an optional embodiment, the terminal determines, according to an indication of the network, that CSI-RSs in the slot use different parameters. For example, the terminal determines, according to an indication of the network, that CSI-RSs in the slot use different scrambling code sequence numbers. The indication of the network may be the presence of a parameter. The terminal determines, depending on whether a parameter is present, that the first and second CSI-RSs use the same or different scrambling code sequence numbers. For example, when the terminal detects the presence of the scrambling parameter in the configuration group parameter, the terminal determines that the second CSI-RS and the first CSI-RS use different scrambling parameters. When the terminal detects the absence of the scrambling parameter in the configuration group parameter, the terminal determines that the second CSI-RS and the first CSI-RS use the same scrambling parameter.

In an optional embodiment, the terminal determines, according to the scrambling parameter, a scrambling code sequence number used by the CSI-RS, and the terminal determines, according to the difference between scrambling code sequence numbers, a scrambling code used by the second CSI-RS. The terminal determines, according to a scrambling code difference indicated by the network, the scrambling code sequence number used by the second CSI-RS. For example, the network configures the first CSI-RS to use a scrambling code k. The difference configured by the network is t. The terminal determines that the second CSI-RS uses the scrambling code k. When the terminal determines a second CSI-RS parameter, the scrambling code (k+t) mod N is used, wherein mod is a modulo operation, and N is a value set according to a bit width of the scrambling code, and may be set to, for example, 1024 when the scrambling code is represented by 10 bits. As another example, the scrambling code (k+t+N) mod N is used, so as to expand the value range of t.

In an optional embodiment, the terminal determines, according to the scrambling parameter, a scrambling code sequence number used by the CSI-RS, and the terminal determines, according to a predetermined or configured mapping, a scrambling code used by the second CSI-RS. For example, the network configures, by means of signaling indication or predefinition, a difference table of scrambling codes used by the CSI-RS in the slot. For example, two bits are used for representation. 00 is used to represent that a difference O1 is used, and 01 is used to represent a difference O2, and so on. The terminal may determine, according to a mapping indicated by the network, the scrambling code sequence number used by the second CSI-RS.

The scrambling parameter in the above embodiments may use other names, or may be of other types, or may have other uses, or the like. The terminal may use a similar method to determine that the second CSI-RS and the first CSI-RS use the same or different parameters, without affecting the spirit of the present invention.

FIG. 4 is a flowchart showing a method performed by user equipment according to an embodiment of the present invention.

As shown in FIG. 4, in step 401, a bit indication is received.

Then, in step 403, a CSI-RS resource in one or two consecutive slots is determined according to the received bit indication.

In an optional embodiment, a terminal determines CSI-RS resources in two consecutive slots according to an indication of a network. The indication of the network may be one or a combination of a bit indication and the presence of a parameter.

For example, the network configures a periodicity And-Offset parameter in a configuration group, and the periodicity AndOffset parameter is used to determine the period of the CSI-RS resource and the slot location in the period. The network configures a firstOFDMSymbolInTimeDomain parameter, and the firstOFDMSymbolInTimeDomain parameter is used to determine a symbol location used by a CSI-RS signal in a determined slot. The terminal may determine a resource of a first CSI-RS signal in a slot according to a network configuration.

In an optional embodiment, the network uses a bit to indicate a CSI-RS resource in one or two consecutive slots, and the terminal determines, according to the bit indication, the CSI-RS resource in the one or two consecutive slots. For example, when the indication bit of the network is set to 1, the terminal determines a CSI-RS resource of a CSI-RS in a slot determined by a configuration parameter and a CSI-RS resource of a consecutive next slot. If, when the indication bit of the network is set to 0, the terminal does not assume a resource of a consecutive next slot of a slot determined by a configuration parameter, the terminal should not assume that a valid CSI-RS resource is present in a next slot consecutive to a slot determined by a configuration parameter.

In a specific example, a CSI-RS resource configuration parameter period determined by the terminal according to a CSI-RS configuration group is x, and a slot offset number in the period is y. The terminal determines that a slot n satisfies the period x and the offset parameter y, and the terminal determines a CSI-RS resource in the slot n. The terminal determines a CSI-RS resource in a slot n+1 according to a bit indication. If the indication bit of the network is 1, the terminal determines the CSI-RS resource in the slot n+1. If the indication bit of the network is 0, the terminal does not assume that a valid CSI-RS resource is present in the slot n+1.

In an optional embodiment, the terminal determines that the same parameters are used in the CSI-RS resource in the slot n+1 and the CSI-RS resource in the slot n. The same parameters include some or all of the following parameters: a period, a first symbol location, a frequency domain starting position and bandwidth, a power deviation, a subcarrier starting position, and a scrambling code sequence number.

In an optional embodiment, the terminal determines that a second CSI-RS resource in the slot n+1 and a first CSI-RS resource in the slot n use the same parameters, and that a fourth CSI-RS resource in the slot n+1 uses the same parameters as a third CSI-RS resource in the slot n. The same parameters include some or all of the following: a period, a first symbol location and a frequency domain starting position and bandwidth, a power deviation, a subcarrier starting position, and a scrambling code sequence. The third CSI-RS resource is a CSI-RS resource determined according to a symbol location in the same slot as the first CSI-RS resource and an offset between symbols.

In an optional embodiment, the terminal determines, according to an indication of the network, that the CSI-RS resource in the slot n+1 uses a different parameter than the CSI-RS resource in the slot n. For example, the terminal determines, according to an indication of the network, that the CSI-RS resource in the slot n+1 and the CSI-RS resource in the slot n use different scrambling code sequence numbers. The terminal determines, according to an indication, a scrambling code used by the CSI-RS resource in the slot n+1.

In an optional embodiment, the terminal determines a CSI-RS resource in one or two consecutive slots according to the presence of a parameter. For example, the terminal determines a CSI-RS resource in one or two consecutive slots according to the presence of a scrambling parameter. When the terminal detects the presence of a scrambling parameter in a configuration group parameter, the terminal determines CSI-RS resources in two consecutive slots. When the terminal detects the absence of the scrambling parameter in the configuration group parameter, the terminal determines a CSI-RS resource in one slot. The terminal should not assume that a valid CSI-RS resource is present for a CSI-RS signal in a next slot consecutive to a slot determined by a configuration parameter.

In an optional embodiment, the terminal determines, according to a scrambling parameter, a scrambling code sequence number used by a CSI-RS resource, and the scrambling parameter is the difference between scrambling code sequence numbers of CSI-RS resources in two consecutive slots. The terminal determines, according to the difference between the scrambling code sequence numbers, a scrambling code sequence number used by the CSI-RS resource in the slot n+1. For example, the network configures the CSI-RS in the slot n to use a scrambling code k. The difference configured by the network is t. The terminal determines that the CSI-RS resource in the slot n uses the scrambling code k. When the terminal determines the CSI-RS resource in the slot n+1, the scrambling parameter (k+t) mod N is used, wherein mod is a modulo operation, and N is a value set according to a bit width of the scrambling code. For example, N may be set to 1024 when the scrambling code is represented by 10 bits. As another example, the terminal determines that the CSI-RS resource in the slot n+1 uses the scrambling code (k+t+N) mod N, so as to expand the value range of t.

In an optional embodiment, the terminal determines, according to the scrambling parameter, a scrambling code sequence number used by the CSI-RS resource, and the terminal determines, according to a predetermined or configured mapping, a scrambling code used by the CSI-RS resource in the slot n+1. For example, the network configures, by means of signaling indication or predefinition, a difference table of scrambling codes used by inter-slot CSI-RSs. For example, two bits are used for representation. 00 is used to represent that a difference O1 is used, and 01 is used to represent a difference O2, and so on. The terminal may determine, according to a mapping indicated by the network, a scrambling code sequence number used by a second slot CSI-RS.

In an optional embodiment, the terminal determines a CSI-RS resource in one or two consecutive slots according to a combination of the bit indication and the presence of a parameter. For example, the terminal determines a CSI-RS resource in one or two consecutive slots according to the bit indication, and the terminal determines, according to the presence of a parameter, that CSI-RS resources in two consecutive slots use the same or different parameters. For example, when the indication bit of the network is set to 1, the terminal determines a CSI-RS resource of a CSI-RS in a slot determined by a configuration parameter and a CSI-RS resource of a next slot consecutive thereto. If, when the indication bit of the network is set to 0, the terminal does not assume a resource of a next slot consecutive to a slot determined by a configuration parameter, the terminal should not assume that a valid CSI-RS resource is present for transmission of a CSI-RS signal in a next slot consecutive to a slot determined by a configuration parameter. When the parameter is present, the terminal determines that different parameters are used in two consecutive slots. When the parameter is absent, the terminal determines that the same parameter is used in two consecutive slots.

Optionally, the relationship between the slots n and n+1 in the above embodiment may be similarly applied to different CSI-RS resources having an association therebetween, for example, used for the slot n and a slot n−1. The terminal may determine the configuration of the CSI-RS signal in the slot n−1 from the configuration of the CSI-RS signal in the slot n according to a similar method.

In an optional embodiment, the terminal determines CSI-RS resources in two consecutive slots according to an indication of the network. The network indication is a higher layer indication or a physical layer indication.

Optionally, the network indication is a higher-layer parameter indication. For example, the indication of the network is broadcast in an SIB together with other configuration group parameters, and the terminal may determine, according to the received indication, a CSI-RS resource determined by each group of configuration parameters in one or two consecutive slots.

Optionally, the network indication is a physical layer parameter indication. The terminal receives a system broadcast to obtain a configuration group parameter, and the terminal determines a CSI-RS resource in a first slot according to the configuration group parameter. The terminal determines, according to an indication of physical layer signaling, a CSI-RS resource in one or two consecutive slots. For example, the physical layer signaling indicates, by means of DCI, a CSI-RS resource in one or two consecutive slots. For example, the DCI may carry a bit indication or a scrambling parameter indication therein. The terminal may determine, according to the detected DCI, an associated CSI-RS resource in one or two consecutive slots.

The parameter in the above embodiments is exemplified by the scrambling parameter, and may use other names, or may be of other types, or may have other uses, or the like. The terminal may use a similar method to determine that the second CSI-RS resource and the first CSI-RS resource use the same or different parameters, without affecting the spirit of the present invention.

FIG. 5 is a flowchart showing a method performed by user equipment according to an embodiment of the present invention.

As shown in FIG. 5, in step 501, indication information is received, the indication information representing a state of a symbol in a slot.

Then, in step 503, a CSI-RS signal resource parameter is determined according to the indication information.

In a network, a terminal may determine, according to a tdd-UL-DL-ConfigurationCommon parameter configured by a system, that a symbol state in a slot is one of uplink, downlink, or flexible. For example, the network configures a period and the number of uplink and downlink symbols by means of tdd-UL-DL-ConfigurationCommon. The terminal may determine the number and locations of uplink symbols, downlink symbols, and flexible symbols in the period according to a slot length parameter of a bandwidth thereof. It may also be possible that the network configures two consecutive periods, and the terminal may determine a symbol state in each period according to similar means. It may also be possible that the network does not configure the tdd-UL-DL-ConfigurationCommon parameter, and the terminal determines that the symbol in the slot is flexible.

In an optional embodiment, the terminal determines a CSI-RS resource in a slot n and a symbol l according to the slot symbol state. When the terminal determines, according to a system information configuration, that the same symbol l in a consecutive next slot n+1 is downlink, the terminal determines a CSI-RS resource in the consecutive next slot n+1. When the terminal determines, according to the system information configuration, that the same symbol l in a consecutive next slot n+1 is uplink, the terminal should not assume that a valid CSI-RS resource is present for transmission of a CSI-RS signal in a next slot consecutive to a slot determined by a configuration parameter. The terminal determines that the CSI-RS is not transmitted in the consecutive next slot.

In a specific example, when the network uses a normal CP configuration, each slot includes 14 symbols, which may be numbered 0-13. The terminal determines, according to a parameter configured by the network, that symbols 0, 1, 2, 3, 4, 5, 6, 7, and 8 of the slot n+1 are downlink, symbols 9 and 10 are flexible, and symbols 11, 12, and 13 are uplink. The terminal determines a CSI-RS resource on a symbol 4 in the slot n. The terminal determines, according to a system configuration, that the symbol 4 in the slot n+1 is downlink, and the terminal determines a CSI-RS resource in the slot n+1.

As another example, the terminal determines, according to the slot symbol state, that the symbols 0-13 of the slot n+1 are uplink. The terminal determines a CSI-RS signal of the symbol 4 in the slot n. The terminal does not assume that the symbol 4 in the slot n+1 transmits the CSI-RS signal.

In an optional embodiment, the terminal determines CSI-RS resources in the slot n and the two different symbols l1 and l2 according to the slot symbol state. When the terminal determines, according to the system information configuration, that both the symbols l1 and l2 in the consecutive slot n+1 are downlink, the terminal determines transmission of the CSI-RS in the consecutive slot n+1. When the terminal determines, according to the system information configuration, that one of the same symbols in the consecutive slot n+1 is uplink, the terminal determines that the CSI-RS is not transmitted in the consecutive slot n+1.

In an optional embodiment, the terminal determines, according to the slot symbol state, CSI-RS resources in the two different symbols l1 and l2 in the slot n and the slot n+1. When the terminal determines, according to the system information configuration, that the same symbols l1 and l2 in the consecutive slot n+1 are both downlink, the terminal determines a CSI-RS resource in the consecutive next slot n+1, and the terminal determines transmission of the CSI-RS in the consecutive next slot.

In an optional embodiment, the terminal determines, according to the slot symbol state, CSI-RS resources in the two different symbols l1 and l2 in the slot n and the slot. When the terminal determines, according to the system information configuration, that among the same symbols l1 and l2 in the consecutive slot n+1, the symbol l1 is downlink and the symbol l2 is flexible, the terminal determines a CSI-RS resource in the consecutive next slot n+1, and the terminal determines transmission of the CSI-RS in the consecutive next slot.

In an optional embodiment, the terminal determines, according to the slot symbol state and a bandwidth parameter, CSI-RS resources in the two different symbols l1 and l2 in the slot n and the slot n+1. When the terminal determines, according to the system information configuration, that the same symbols l1 and l2 in the consecutive slot n+1 are both downlink, and the bandwidth is located in a frequency band in FR1, the terminal determines a CSI-RS resource in the consecutive next slot n+1, and the terminal determines transmission of the CSI-RS in the consecutive next slot.

In an optional embodiment, the terminal determines, according to the slot symbol state and the bandwidth parameter, CSI-RS resources in the two different symbols l1 and l2 in the slot n and the slot. When the terminal determines, according to the system information configuration, that among the same symbols l1 and l2 in the consecutive slot n+1, the symbol l1 is downlink and the symbol l2 is flexible, and the bandwidth is located in a frequency band in FR1, the terminal determines a CSI-RS resource in the consecutive next slot n+1, and the terminal determines transmission of the CSI-RS in the consecutive next slot.

In an optional embodiment, the terminal determines that the same parameters are used for transmission in the CSI-RS resource in the slot n+1 and the CSI-RS resource in the slot n. The same parameters include some or all of the following parameters: a period, a first symbol location, a frequency domain starting position and bandwidth, a power deviation, a subcarrier starting position, and a scrambling code sequence number.

In an optional embodiment, the terminal determines that a second CSI-RS resource in the slot n+1 and a first CSI-RS resource in the slot n use the same parameters, and that a fourth CSI-RS resource in the slot n+1 uses the same parameters as a third CSI-RS resource in the slot n. The same parameters include some or all of the following: a period, a starting symbol location and a frequency domain starting position and bandwidth, a power deviation, a subcarrier starting position, and a scrambling code sequence. The third CSI-RS resource is the CSI-RS resource in the same slot and determined according to a symbol location of the first CSI-RS resource and an offset between symbols.

In an optional embodiment, the terminal determines, according to an indication of the network, that the CSI-RS resource in the slot n+1 and the CSI-RS resource in the slot n use different parameters. Optionally, the indication of the network is the presence of a parameter. For example, the terminal determines, according to the presence of a parameter, that the CSI-RS in the slot n+1 and the CSI-RS in the slot n use different scrambling code sequence numbers. When the parameter is present, the terminal determines that different parameters are used in two consecutive slots. When the parameter is absent, the terminal determines that the same parameter is used in two consecutive slots. The terminal determines, according to an indicated parameter, a scrambling code used by the CSI-RS in the slot n+1, as in the example in the foregoing embodiment.

Optionally, the relationship between the slots n and n+1 in the above embodiment may be similarly applied to different CSI-RS resources having an association therebetween, for example, used for the slot n and a slot n−1. The terminal may determine, according to a similar method, the configuration of the CSI-RS signal in the slot n−1 from the configuration of the CSI-RS signal in the slot n.

In an optional embodiment, the network indicates availability of a CSI-RS resource by means of physical layer signaling, and the terminal may determine, according to the indication of the network, whether there is CSI-RS signal transmission on a certain CSI-RS resource. The network may indicate one-time availability of one CSI-RS resource or the availability within a period of time. For example, the terminal may determine, according to an indication in paging advance indication signaling, that a CSI-RS resource before a relevant paging PDCCH is an available resource. Upon determining the CSI-RS resource according to the configuration, the terminal determines, according to physical layer signaling, the availability of the CSI-RS resource in a certain slot, and the terminal determines that there is CSI-RS signal transmission on the available CSI-RS resource. As another example, the terminal may determine, according to an indication in paging PDCCH signaling of the network, the availability of the CSI-RS resource within a period of time, for example, within several paging cycles. Optionally, the terminal determines that CSI-RS resources using SSBs having the same SSB sequence number as reference signals have the same availability. For example, the terminal may determine, according to a one-bit indication in physical layer signaling, the availability of one or more relevant CSI-RS resources. Optionally, the terminal determines that one or more CSI-RS resources determined according to the same configuration group parameter have the same availability. For example, according to the foregoing embodiment, the terminal may determine a CSI-RS resource in one or two consecutive slots according to an indication of the network, and the terminal determines that these resources have the same availability. For example, the terminal may determine, according to a one-bit indication in physical layer signaling, the availability of a plurality of CSI-RS resources in one or two consecutive slots.

Hereinafter, FIG. 6 is used to illustrate user equipment that can perform the method performed by user equipment described in detail above in the present invention as a variant embodiment.

FIG. 6 shows a block diagram of user equipment (UE) according to the present invention.

As shown in FIG. 6, the user equipment (UE) 60 includes a processor 601 and a memory 602. The processor 601 may include, for example, a microprocessor, a microcontroller, an embedded processor, and the like. The memory 602 may include, for example, a volatile memory (such as a random access memory (RAM)), a hard disk drive (HDD), a non-volatile memory (such as a flash memory), or other memories. The memory 602 stores program instructions. The instructions, when run by the processor 601, can implement the above method performed by user equipment as described in detail in the present invention.

The method and related equipment according to the present invention have been described above in combination with preferred embodiments. It should be understood by those skilled in the art that the method shown above is only exemplary, and the above embodiments can be combined with one another as long as no contradiction arises. The method of the present invention is not limited to the steps or sequences illustrated above. The network node and user equipment illustrated above may include more modules. For example, the network node and user equipment may further include modules that can be developed or will be developed in the future to be applied to a base station, an MME, or UE, and the like. Various identifiers shown above are only exemplary, and are not meant for limiting the present invention. The present invention is not limited to specific information elements serving as examples of these identifiers. A person skilled in the art could make various alterations and modifications according to the teachings of the illustrated embodiments.

It should be understood that the above-described embodiments of the present invention may be implemented by software, hardware, or a combination of software and hardware. For example, various components of the base station and user equipment in the above embodiments can be implemented by multiple devices, and these devices include, but are not limited to: an analog circuit device, a digital circuit device, a digital signal processing (DSP) circuit, a programmable processor, an application-specific integrated circuit (ASIC), a field-programmable gate array (FPGA), a complex programmable logic device (CPLD), and the like.

In the present application, the "base station" may refer to a mobile communication data and control exchange center having large transmission power and a wide coverage area, including functions such as resource allocation and scheduling and data reception and transmission. "User equipment" may refer to a user mobile terminal, for example, including terminal devices that can communicate with a base station or a micro base station wirelessly, such as a mobile phone, a laptop computer, and the like.

In addition, the embodiments of the present invention disclosed herein may be implemented on a computer program product. More specifically, the computer program product is a product provided with a computer-readable medium having computer program logic encoded thereon. When executed on a computing device, the computer program logic provides related operations to implement the above technical solutions of the present invention. When executed on at least one processor of a computing system, the computer program logic causes the processor to perform the operations (the method) described in the embodiments of the present invention. Such setting of the present invention is typically provided as software, codes and/or other data structures provided or encoded on the computer-readable medium, e.g., an optical medium (e.g., compact disc read-only memory (CD-ROM)), a flexible disk or a hard disk and the like, or other media such as firmware or micro codes on one or more read-only memory (ROM) or random access memory (RAM) or programmable read-only memory (PROM) chips, or a downloadable software image, a shared database and the like in one or more modules. Software or firmware or such configuration may be installed on a computing device such that one or more processors in the computing device perform the technical solutions described in the embodiments of the present invention.

In addition, each functional module or each feature of the base station device and the terminal device used in each of the above embodiments may be implemented or executed by a circuit, which is usually one or more integrated circuits. Circuits designed to execute various functions described in this description may include general-purpose processors, digital signal processors (DSPs), application-specific integrated circuits (ASICs) or general-purpose integrated circuits, field-programmable gate arrays (FPGAs) or other programmable logic devices, discrete gates or transistor logic, or discrete hardware components, or any combination of the above. The general purpose processor may be a microprocessor, or the processor may be an existing processor, a controller, a microcontroller, or a state machine. The aforementioned general purpose processor or each circuit may be configured by a digital circuit or may be configured by a logic circuit. Furthermore, when advanced technology capable of replacing current integrated circuits emerges due to advances in semiconductor technology, the present invention can also use integrated circuits obtained using this advanced technology.

While the present invention has been illustrated in combination with the preferred embodiments of the present invention, it will be understood by those skilled in the art that various modifications, substitutions, and alterations may be made to the present invention without departing from the spirit and scope of the present invention. Therefore, the present invention should not be limited by the above-described embodiments, but should be defined by the appended claims and their equivalents.

The invention claimed is:

1. A method performed by a user equipment (UE) that is in an RRC_IDLE state or an RRC_INACTIVE state, the method comprising:

receiving a system information block comprising a first indication;

receiving a tdd-UL-DL-ConfigurationCommon parameter, as a second indication;

for a frequency range 1 (FR1) band, determining channel state information reference signal (CSI-RS) resources based on the first indication and the second indication, wherein the determined CSI-RS resources comprise:

four CSI-RS resources in two consecutive slots, with two CSI-RS resources in each slot, in a case that (i) a value of the first indication is a first value, and (ii) symbols of resources in a second slot of the two consecutive slots are indicated as downlink according to the second indication, and two CSI-RS resources in one slot in a case that the value of the first indication is a second value; and receiving a CSI-RS on the determined CSI-RS resources.

2. A user equipment (UE), comprising:

a processor; and a memory storing instructions, wherein the instructions, when executed by the processor, cause the UE to:

receive: a system information block comprising a first indication;

receive a tdd-UL-DL-ConfigurationCommon parameter, as a second indication;

for a frequency range 1 (FR1) band, determine channel state information reference signal (CSI-RS) resources based on the first indication and the second indication when the UE is in an RRC_IDLE state or an RRC_INACTIVE state, wherein the determined CSI-RS resources comprise:

four CSI-RS resources in two consecutive slots, with two CSI-RS resources in each slot, in a case that (i) a value of the first indication is a first value and (ii) symbols of resources in a second slot of the two consecutive slots are indicated as downlink according to the second indication, and two CSI-RS resources in one slot in a case that (i) the value of the first indication is a second value; and receive a CSI-RS on the determined CSI-RS resources.

* * * * *